United States Patent [19]

German, Jr.

[11] Patent Number: 5,049,423

[45] Date of Patent: Sep. 17, 1991

[54] COMPOSITE THERMOPLASTIC FILMS FOR USE IN STRETCH/CLING APPLICATIONS

[75] Inventor: Paul M. German, Jr., Friendswood, Tex.

[73] Assignee: Exxon Chemical Patents Inc., Linden, N.J.

[21] Appl. No.: 453,558

[22] Filed: Dec. 20, 1989

Related U.S. Application Data

[62] Division of Ser. No. 123,002, Nov. 19, 1987, abandoned.

[51] Int. Cl.$^5$ .............................................. B32B 27/08
[52] U.S. Cl. ................................... 428/35.2; 428/516; 428/517
[58] Field of Search ............... 428/500, 516, 520, 517, 428/35.2; 526/329

[56] References Cited

U.S. PATENT DOCUMENTS

| | | | |
|---|---|---|---|
| 3,350,372 | 10/1967 | Anspon et al. | 260/886.7 |
| 3,508,944 | 4/1970 | Henderson et al. | 117/7 |
| 3,748,962 | 7/1973 | Hilkert et al. | |
| 3,817,821 | 6/1974 | Gallini | 161/165 |
| 4,022,646 | 5/1977 | Casey | 156/164 |
| 4,082,877 | 4/1978 | Shadle | 428/35 |
| 4,147,827 | 4/1979 | Breidt, Jr. et al. | 428/218 |
| 4,189,420 | 2/1980 | Sugimoto et al. | 260/31.6 |
| 4,194,038 | 3/1980 | Mueller | 428/213 |
| 4,303,710 | 12/1981 | Bullard et al. | 428/35 |
| 4,364,981 | 12/1982 | Horner et al. | 428/35 |
| 4,399,180 | 8/1983 | Briggs et al. | 428/212 |
| 4,418,114 | 11/1983 | Briggs et al. | 428/218 |
| 4,425,268 | 1/1984 | Cooper | 524/110 |
| 4,436,788 | 3/1984 | Cooper | 428/483 |
| 4,504,434 | 3/1985 | Cooper | 264/22 |
| 4,518,654 | 5/1985 | Eichbauer et al. | 428/331 |
| 4,588,650 | 5/1986 | Mientus et al. | 428/516 |
| 4,671,987 | 6/1987 | Knott, II et al. | 428/216 |
| 4,680,330 | 7/1987 | Berrien et al. | 524/230 |

FOREIGN PATENT DOCUMENTS 0198091 10/1986 European Pat. Off.
2031801 2/1969 France.
2123747 2/1984 United Kingdom.

OTHER PUBLICATIONS

General Background on Polyethylene, Kirshenbaum: "Polyethylene"; *Modern Plastics Encyclopedia* 1976-1977; pp. 65-73.

General Background on Ethylene-Methyl Acrylate Copolymer, Baker and Buesinger; "The Ethylene Methyl Acrylate Copolymer", *Journal of Plastic Film and Sheeting;* vol. 3 (Apr. 1987); pp. 112-117.

General Properties of Specialty Films, "Modern Plastics Encyclopedia, 1977/1978 Encyclopedia and Buyers Guide"; vol. 50, No. 12, Dec. 1977 (excerpt).

Commercial Brochure, "Stretch It. New . . . Mobilrap ® C"; Mobil Plastics Packaging.

*Primary Examiner*—Joseph L. Schofer
*Assistant Examiner*—Jeffrey T. Smith
*Attorney, Agent, or Firm*—Myron B. Kurtzman

[57] ABSTRACT

A thermoplastic film is provided which is especially suited for use in stretch/cling applications such as, for example, the bundling, packaging and unitizing of foods and other goods. The film comprises a cling layer comprising a polymer of at least ethylene and acrylate, preferably without a tackifying additive. The film further comprises a slip layer comprising a polyolefin preferably including an anticling (slip and/or antiblock) additive. Preferred polyolefins include linear low density polyethylene and polypropylene.

4 Claims, No Drawings

COMPOSITE THERMOPLASTIC FILMS FOR USE IN STRETCH/CLING APPLICATIONS

This is a division of application Ser. No. 123,002, filed Nov. 19, 1987, now abandoned.

BACKGROUND OF THE INVENTION

The present invention relates generally to thermoplastic films and, more particularly, to thermoplastic films having properties making them especially well suited for use as stretch/cling wraps in various bundling, packaging and palletizing operations.

Stretch/cling films have found utility in a wide variety of fields including the bundling and packaging of food and other goods. One application of particular, but not limiting, interest to the present invention is in the bundling of goods for shipping and storage such as, for example, the bundling of large rolls of carpet, fabric or the like for shipping from the manufacturer to a retail outlet. An important subset of these bundling applications is in the containment and unitizing of pallet loads.

The load of a pallet may be unitized or "bundled" by stretch-wrapping a film several times around the articles to be palletized. There exist a variety of stretch-wrapping techniques, two of which are commonly employed. In one technique, the loaded pallet is placed on a rotating turntable and the end of a continuous roll of film attached to the load. As the turntable rotates, the film is continuously wrapped around the pallet and load. Tension is applied to the film roll to cause the film to stretch as it is applied.

In another technique, the converse occurs, i.e., the pallet and load are kept stationary and the continuous roll of film rotated around the pallet and load. Again tension is applied to the film roll to cause the film to stretch as it is applied.

Because the film is in a stretched condition, it is placed under considerable tension and will have a tendency to return to its original, unstretched state. This tension can cause the film to unravel from the wrapped pallet, thereby jeopardizing the integrity of the unitized load. It is desirable, therefore, that the film have cling properties to prevent unraveling of the film from the pallet.

To impart cling properties to, or improve the cling properties of, a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge.

The use of tackifying additives, however, is not desirable. These additives have a tendency to accumulate on the stretch wrapping apparatus often requiring additional periodic cleaning and maintenance. They also can migrate into the bundled or unitized articles resulting in damage to such articles, as well as migrating throughout a film, even a multilayer film, causing tackiness on both sides. In palletizing operations, this may cause the film on adjacent pallets to cling together resulting in tear, puncture or other damage to the wrap and jeopardizing the integrity of the unitized load.

For this reason, it is desirable for the film to have slip properties on its "outer" side to prevent this interpallet cling. Slip is defined in terms of coefficient of friction. In other words, it is desirable that the "outer" side of the film have a low coefficient of friction in contact with another object, particularly another like film. As with cling, slip can be imparted to the film or improved through the use of various well-known slip and/or antiblock additives including silicas, silicates, diatomaceous earths, talcs and various lubricants. Under highly stretched conditions, however, the coefficient of friction in the films tends to increase and even the slip additives may not provide the desired slip properties.

The tension in the stretched film may also cause the film to be more susceptible to punctures and tears. It is, therefore, also desirable for the film, as a whole, to have good stretch, tensile, puncture resistance and tear resistance properties.

Additionally, thermal stability of the various film components is important for the recycling of edge trim and film scrap generated in the various film production processes.

A wide variety of thermoplastic polymers such as, for example, polyvinyl chloride, polyethylene, polypropylene and various polymers of ethylene and other comonomers, most notably vinyl acetate, have been used as stretch/cling films. These materials standing alone, however, suffer from a number of shortcomings. Most do not possess desirable cling properties without the use of tackifying additives. Further, most cannot be stretched to a great extent without adversely affecting their slip, tensile, tear resistance and puncture resistance properties. For the particular case of ethylene-vinyl acetate polymers, thermal stability becomes a problem on the reprocessing of trim and scrap.

More recently, the use of multilayer films has gained popularity. With a multilayer film, one can obtain a stretch/cling wrap having cling properties on one side and slip properties on the other side. For example, U.S. Pat. No. 4,518,654 discloses a multilayer film having an A/B construction wherein the A side has cling characteristics and the B side has slip characteristics. In the aforementioned patent, the A side is said to comprise a polyethylene or an ethylene-monoolefin polymer, preferably linear low density polyethylene (LLDPE). To provide the LLDPE with the desired cling properties, a tackifying agent is added to the polymer. The B side is said to comprise a low density polyethylene (LDPE) with an anticling additive added to impart the desired slip properties to the LDPE. This patent is hereby incorporated by reference herein for all purposes as if fully set forth.

Other multilayer films comprising layers of the various aforementioned stretch/cling materials are disclosed in U.S. Pat. Nos. 3,508,944, 3,748,962, 3,817,821, 4,022,646. 4,082,877, 4,147,827, 4,189,420, 4,194,039, 4,303,710, 4,399,180, 4,364,981, 4,418,114, 4,425,268, 4,436,788, 4,504,434, 4,588,650 and 4,671,987; U.K. Patent Appln. No. 2123747; French Patent No. 2031801; and European Patent Appln. No. 0198091, all of which are also incorporated by reference herein for all purposes. These multilayer films are generally produced by one of a number of well-known coextrusion processes also disclosed in the aforementioned incorporated references.

Many of the multilayer films, however, still suffer from shortcomings possessed by their individual layers. For instance, most still require the use of tackifying additives to impart cling properties to the film. As previously mentioned, these tackifying additives have a tendency to accumulate on dispensing apparatus and may migrate through the films to the slip side. Also, films containing a tackifying additive may be prepared and used in such a manner that the tackifying additive is "picked off" and onto the slip side of the film because the slip and cling layers of the film are in intimate contact on the film roll. Others do not possess desired slip properties, particularly when in a highly stretched state. Still others do not possess a desirable combination of stretch, tensile, tear resistance, puncture resistance and thermal stability properties.

SUMMARY OF INVENTION

The present invention, therefore, provides a thermoplastic film having properties especially well suited for use as a stretch/cling wrap.

The present invention also provides a thermoplastic film having excellent cling properties, even without the use of a tackifying additive. In fact, it is desired with the present invention to omit the use of such tackifying additives.

The present invention further provides a multilayer stretch/cling film having excellent cling properties on one side and excellent slip properties on an opposite side, even in a highly stretched state.

Still further, the present invention provides a multilayer stretch/cling film which, as a whole, possess desirable stretch, tensile strength, puncture resistance, tear resistance and thermal stability properties.

Finally, the present invention provides a process for producing such a stretch/cling film, a process for using such stretch/cling film to bundle, package or unitize an article or a plurality of articles, and an article or plurality of articles so bundled, packaged or unitized.

In accordance with the present invention, there is provided a thermoplastic film which comprises, in its overall concept, a cling layer comprising a polymer of two or more monomers, wherein a first monomer comprises ethylene and a second monomer comprises an acrylate. Such polymer shall generally be referred to as an ethylene-acrylate (or EA) polymer.

More particularly, the EA polymer comprises an acrylate content of between about 2% to about 40%, more preferably between about 10% to about 35%, most preferably between about 20% to about 30%, by weight based upon the weight of the EA polymer. A tackifying additive may optionally be added to the EA polymer to improve its cling, but this is not desired and is preferably omitted.

The thermoplastic film may further comprise a second cling layer opposite the first cling layer, but preferably comprises a slip layer opposite the cling layer, the slip layer comprising any suitable polyolefin. Particularly preferred are linear low density polyethylene (LLDPE) and polypropylene. Additionally, the slip side may include one or more well-known anticling (slip and/or antiblock) additives.

The thermoplastic film of the invention may be so constructed that a second layer opposite the first cling layer is structural layer and a third layer is positioned adjacent the second, structural layer. That is, the structural layer separates the first cling layer and the third layer. The third layer of the thermoplastic film may comprise a cling layer or a slip layer. In either case, the third layer may be a polyolefin. Preferably, when the third layer is a cling layer, it also comprises a polymer of 2 or more monomers, wherein a first monomer comprises ethylene and a second monomer comprises an acrylate (EA). Where the third layer is a slip layer, it may include one or more of the well-known anticling (slip and/or antiblock) additives. The second, structural layer of the thermoplastic films having more than 2 layers comprises about 5 to 95%, preferably at least about 50%, more preferably at least about 70-80% of the weight of the film. The second layer may comprise a polyolefin of suitable makeup for the purpose to which the film is to be applied.

The thermoplastic film of the present invention may be produced utilizing any one of a number of well known extrusion or coextrusion (in the case of multilayer films) processes. In a multilayer film, the cling layer will preferably comprise from about 5% to about 95%, and the slip layer will preferably comprise from about 95% to about 5%, of the combined thickness of the cling and slip layers.

Thermoplastic films produced in accordance with the present invention have excellent cling properties on the cling layer and slip properties on the slip layer. Particularly, the use of tackifying additives can be avoided because of the excellent cling properties of the cling layer EA polymer. The present thermoplastic films, as a whole, additionally have desirable stretch, tensile, puncture resistance and tear resistance properties. Further, the thermoplastic compounds used for the cling and slip layers have excellent thermal stability, and edge trim scrap can be processed without significant loss of film performance. This combination of properties makes the thermoplastic films of the present invention especially well suited for use as stretch/cling wraps.

These and other features and advantages of the present invention will be more readily understood by those skilled in the art from a reading of the following detailed description.

DETAILED DESCRIPTION OF THE PREFERRED EMBODIMENTS

As previously indicated, the present invention provides a thermoplastic film having excellent cling, slip, stretch, tensile, tear resistance, puncture resistance and thermal stability properties, making such film especially well suited for use as a stretch/cling wrap.

The thermoplastic film, in its overall concept, comprises a cling layer which comprises a polymer of two or more monomers, wherein a first monomer comprises ethylene and a second monomer comprises an acrylate. Acrylate, in the singular, refers to both a single acrylate and combinations of different acrylates. These polymers will generally be referred to as ethylene-acrylate (or EA) polymers.

In the preferred embodiment, the EA polymer comprises an acrylate content of between about 2% to about 40%, more preferably between about 10% to about 35%, most preferably between about 20% to about 30%, by weight based upon the weight of the EA polymer. The EA polymer may have a wide range of melt indexes (MI), generally between about 0.1 to about 30, more preferably between about 1 to about 10, g/10 min. (ASTM D-1238, Condition E).

Acrylates useful in the present invention are those of the general formula

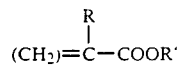

wherein R is selected from hydrogen or a hydrocarbon group having from 1 to 22 carbon atoms, preferably an alkyl, aryl, aromatic, olefin or the like hydrocarbon group, and wherein R' is selected from the same or different of these hydrocarbon groups.

Preferred acrylates comprise those wherein R is selected from hydrogen or an alkyl group and wherein R' is the same or different such alkyl group. Specific examples of preferred acrylates include methyl acrylate, ethyl acrylate, propyl acrylate, n-butyl acrylate, 2-ethylhexyl acrylate, decyl acrylate, octadecyl acrylate, methyl methacrylate, ethyl methacrylate, n-butyl methacrylate and the like. Particularly preferred are methyl acrylate, ethyl acrylate and n-butyl acrylate.

As previously indicated, the EA polymer can comprise more than two monomers, with at least a first monomer comprising ethylene and a second monomer comprising one or more of the above-defined acrylates. For the case of ter- or additional monomers, suitable examples include, but are not limited to, other free radically polymerizable monomers such as, for example, vinyl esters, acrylic acids (i.e., methacrylic and ethacrylic acid), other acrylates, carbon monoxide and the like. These additional monomers will generally be present in small amounts, usually less than a total of about 10% by weight based upon the weight of the EA polymer.

The EA polymer may be produced by any one of a number of well-known processes such as, for example, those described in U.S. Pat. No. 3,350,372, which is incorporated by reference for all purposes as if fully set forth. Generally ethylene, acrylate and, if desired, another monomer(s) are metered into, for example, a high pressure autoclave reactor along with any one of a number of well-known free radical polymerization initiators (catalysts) suitable for producing EA polymers. Particularly preferred catalysts include organic peroxides such as, for example, lauroyl peroxide, di-tert butyl peroxide, tert butyl peroxide and various azo compounds. Typically, the catalyst will be dissolved in a suitable organic liquid such as benzene, mineral oil or the like. Ordinarily the catalyst is used at a level of between about 50 to about 20,000, more preferably between about 100 to about 250, ppm based upon the weight of the monomers.

Optionally, small amounts of a tackifying additive may be added to the EA polymer during the polymerization reaction or subsequently blended in to improve the cling properties of the film. A wide variety of tackifying additives are well known in the art including, for example, polybutenes, atactic polypropylenes, terpene resins, hydrogenated rosins, rosin esters and other like hydrocarbon tackifying resins. It should be noted, however, that the aforedescribed EA polymers produce films of sufficient cling so as to not require the use of a tackifying additive. For reasons previously detailed, the use of such tackifying additives is not desirable, should be avoided and preferably is omitted.

The EA polymer may, if desired, also include one or more other well-known additives such as, for example, antioxidants, ultraviolet absorbers, antistatic agents, release agents, pigments, colorants or the like; however, this should not be considered a limitation of the present invention.

The film of the present invention may further comprise a second cling layer opposite this first cling layer, but preferably further comprises a slip layer opposite the cling layer, the slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred are polypropylene and linear low density polyethylene (LLDPE), i.e., a copolymer of ethylene with up to about 20% by weight $C_4$ to $C_{10}$ olefin(s). Especially preferred olefins include 1-butene, 1-hexene, 1-octene and 4-methyl pentene-1.

Suitable LLDPEs include those having a density greater than about 0.900 g/cc, more preferably in the range of from about 0.900 to about 0.940 g/cc. The LLDPEs may also have wide ranging MIs, generally up to about 30 g/10 min., preferably between about 0.5 to about 10 g/10 min. Such LLDPEs and methods for making the same are well-known in the art and are readily available commercially.

Suitable polypropylene is normally solid and isotactic, i.e., greater than 90% hot heptane insolubles, having wide ranging melt flow rates of from about 0.1 to about 300 g/10 min. As is known, such polypropylene is normally crystalline with a density range of from about 0.89 to about 0.91 g/cc for isotactic polypropylene. Such polypropylene and methods for making the same are well-known in the art and are readily available commercially.

Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the B layer.

The slip layer may, if desired, also include one or more other well-known additives such as, for example, antioxidants, ultraviolet absorbers, antistatic agents, release agents, pigments, colorants or the like; however, this again should not be considered a limitation of the present invention.

Additionally, normal trim and scrap from the film production process can be recycled into either the cling or slip layers, but preferentially to the slip layer of a two-layer film or the core structural layer of a three-layer film.

The present invention may also include one or more intermediate layers between the cling and slip layers for any one of a number of well-known purposes such as, for example, to modify the overall physical properties balance of the film, to utilize the recycle trim and scrap or to provide a barrier layer to oxygen or other gases. As just indicated, this intermediate layer may comprises the recycle trim and scrap, or may comprise any other suitable polymer. The intermediate layer(s), however, is optional and should not be considered a limitation on the present invention.

In preparing the thermoplastic stretch/cling films of the present invention, any one of a number of well-known extrusion or coextrusion (in the case of multilayer films) techniques as disclosed in the previously incorporated references may be utilized. As preferred examples, any of the blown or chill roll cast processes as disclosed and described in those references is suitable for use in producing thermoplastic stretch/cling films in accordance with the present invention.

In a multilayer film, the cling layer preferably comprises between about 5% to about 95%, more preferably between about 5% to about 35%, most preferably between about 10% to about 20%, of the combined thickness of the cling and slip layers. Conversely, the slip layer preferably comprises between about 5% to about 95%, more preferably between about 65% to about 95%, most preferably between about 80% to about 90%, of the combined thickness of the cling and slip layers.

As previously mentioned, the thermoplastic films of the present invention have properties making them especially well suited for use as stretch/cling films; however, this use should not be considered a limitation on the present invention. For example, these films can be made into other forms, such as a tape, by any one of a number of well-known cutting, slitting and/or rewinding operations. Physical properties including, but not limited to, tensile strength, tear strength and elongation can be adjusted over wide ranges by altering the resin types and specifications as appropriate to meet the requirements of a given wrapping, bundling or taping application.

For bundling, packaging and unitizing applications, the thermoplastic film of the present invention is stretch-wrapped by any one of a number of well-known procedures (such as those disclosed in the aforementioned incorporated references) around an article or a plurality of articles preferably so that the cling layer faces inside (towards the article) and the slip layer faces outside (away from the article). Typical of articles suitable for bundling, packaging and unitizing with the present thermoplastic film include, but are not limited to, various foodstuffs (canned or fresh), rolls of carpet, liquid containers and various like goods normally containerized and/or palletized for shipping, storage and/or display.

The foregoing more general discussion of this invention will be further exemplified by the following specific examples offered by way of illustration and not limitation of the above-described invention.

EXAMPLES

In the following examples, property evaluations were made in accordance with the following tests:

(1) Coefficient of Friction (COF)—ASTM D-1894.

(2) Cling—cling is reported as the force in grams required to partially peel apart two strips of film. A first film strip is attached to a 30° inclined plane with the outside surface (slip) facing upward. A second 1"×8" strip is placed on top of the first strip with the inside surface (cling) facing downward. Pressure is applied to the second strip to cause the two strips to stick together. If an evaluation of cling under stretched conditions is desired, both film strips are prestretched and allowed to relax before testing.

The end of the second strip at the base of the inclined plane is attached, by clip and string, to an apparatus which can exert a strain at a constant rate (Instron 1130). The two strips are then pulled apart at a crosshead speed of 10 cm/min until the aforementioned string is parallel with the base of the inclined plane. The force at this point is reported as cling.

EXAMPLES 1-10

An ethylene-methyl acrylate (EMA) copolymer, with an MI of 5 g/10 min., was coextruded with a LLDPE (ethylene-hexene) having a density of 0.918 g/cc and an MI of 3.2 g/10 min. (commercially available from Exxon Chemical Company, Houston, Tex., under the trade designation LL-3003). Slip (Kememide E, a commercial erucimide available from Humko Chemical Company, Memphis, Tenn.) and antiblock (Super Floss ™, a commercial silica available from Johns Manville) were added to the LLDPE. Other properties of the EMA and LLDPE are listed below in Table I.

The film was produced by coextruding the EMA copolymer and LLDPE on a Black Clawson cast film line with two 3.5" extruders, respectfully, for the EMA and LLDPE layers. The EMA was extruded at a melt temperature of 400° F., while the LLDPE was extruded at a melt temperature of 450° F. The chill roll temperature was set to 80° F. and the line speed to 450 feet per minute.

The resulting film had a gauge of 0.8 mil, with the EMA layer comprising 20% of the total film thickness. The O/O slip (LLDPE/LLDPE) was then measured as the coefficient of friction (COF) for 0%, 100% and 200% stretch, and I/O cling (EMA/LLDPE) was measured for 100% and 200% stretch. The results are presented below in Table I.

TABLE I

| Ex. | % MA | AB (ppm) | SLIP (ppm) | COF (kinetic) 0% | COF (kinetic) 100% | COF (kinetic) 200% | CLING (grams) 100% | CLING (grams) 200% |
|---|---|---|---|---|---|---|---|---|
| 1 | 24 | 10000 | 500 | 0.19 | 0.21 | 0.35 | 20 | 30 |
| 2 | 24 | 0 | 500 | >1 | >1 | >1 | 107 | 90 |
| 3 | 24 | 5000 | 1000 | 0.20 | 0.35 | 0.44 | 50 | 50 |
| 4 | 24 | 5000 | 0 | 0.45 | 0.83 | >1 | 90 | 85 |
| 5 | 24 | 5000 | 500 | 0.26 | 0.61 | >1 | 77 | 72 |
| 6 | 28 | 10000 | 500 | 0.23 | 0.28 | 0.42 | 77 | 65 |
| 7 | 28 | 0 | 500 | >1 | >1 | >1 | 175 | 126 |
| 8 | 28 | 5000 | 1000 | 0.21 | 0.32 | 0.51 | 83 | 75 |
| 9 | 28 | 5000 | 0 | 0.70 | >1 | >1 | 149 | 113 |
| 10 | 28 | 5000 | 500 | 0.45 | 0.75 | >1 | 114 | 86 |

EXAMPLES 11 AND 12

A 28% MA, 3 g/10 min. MI, EMA copolymer was coextruded with LL-3003 as in Examples 1-10. EMA extrusion melt temperature was 440° F. and LLDPE extrusion melt temperature was 470° F. Slip and antiblock additives were again added to the LLDPE.

The resulting film had a gauge of 0.85 mil, with the EMA layer comprising 15% of the total film thickness. The O/O slip (LLDPE/LLDPE) was then measured as the coefficient of friction (COF) for 0%, 100% and 200% stretch, and I/O cling (EMA/LLDPE) was measured for 0%, 100% and 200% stretch. The results are presented below in Table II. These films were also evaluated on a commercial Lantech V-Series Power Prestretch machine at 160% and 330% stretch with the results presented in Table III.

TABLE II

| Ex. | AB (ppm) | SLIP (ppm) | COF (kinetic) 0% | 100% | 200% | CLING (grams) 0% | 100% | 200% |
|---|---|---|---|---|---|---|---|---|
| 11 | 5000 | 500 | 0.39 | 0.48 | 0.80 | 165 | 170 | 130 |
| 12 | 10000 | 1000 | 0.25 | 0.33 | 0.54 | 70 | 110 | 75 |

TABLE III

| Ex. | SLIP 160% | 330% | CLING 160% | 330% |
|---|---|---|---|---|
| 11 | good | fair | good | good |
| 12 | excell. | v. good | v. good | good |

EXAMPLE 13

A 24% MA, 5 g/10 min. MI, EMA copolymer was coextruded with a 12 melt flow rate (ASTM D-1238, condition L) polypropylene (commercially available from Exxon Chemical Company, Houston, Tex., under the trade designation PP-3014) as in Examples 1–10. No slip and/or antiblock additives were added to the polypropylene. The EMA copolymer layer comprised about 30% of the total film thickness.

The O/O slip (polypropylene/polypropylene) was then measured as the COF, and the I/O (EMA/polypropylene) cling measured as in Examples 11 and 12. The results are presented in Table IV below.

EXAMPLE 14

A 24% MA, 5 g/10 min. MI, EMA copolymer was coextruded with a blend of 10 wt % PP-3014, 90 wt % LL-3003, 5000 ppm antiblock and 500 ppm slip (as in Examples 1–10). The EMA copolymer layer comprised about 30% of the total film thickness. The O/O slip was then measured as the COF, and the I/O cling measured as in Examples 11 and 12. The results are presented in Table IV below.

TABLE IV

| Ex. | AB (ppm) | SLIP (ppm) | COF (kinetic) 0% | 100% | 200% | CLING (grams) 0% | 100% | 200% |
|---|---|---|---|---|---|---|---|---|
| 13 | 0 | 0 | 0.66 | 0.86 | >1 | 339 | 267 | 234 |
| 14 | 5000 | 500 | 0.73 | 0.90 | >1 | 179 | 164 | 128 |

The results of Tables I–IV show that films in accordance with the present invention exhibited good physical properties, extrusion processability and utility appropriate for stretch/cling wrap applications. The results further demonstrate the ability to tailor film cling and slip properties and balances by altering variables including the EA polymer comonomer contents, resin type(s) of the slip layer, slip additive content of the slip layer and antiblock additive content of the slip layer. The results of Table III further indicate that the overall performance of the films met or exceeded the desired balance of cling, slip, toughness and stretch performance required of stretch/cling wraps.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation on the scope thereof.

I claim:

1. A thermoplastic stretch/cling film comprising:
   a) a cling layer, absent a tackifying additive, said cling layer comprising a polymer of two or more monomers, wherein a first monomer comprises ethylene and a second monomer comprises an acrylate, said polymer comprising an acrylate content of 20% to 30% by weight based upon the weight of said polymer;
   b) a second layer, said second layer being a structural layer; and
   c) a third layer, said third layer being a slip layer.

2. The thermoplastic film of claim 1, wherein said polymer comprises an acrylate content of 24 to 28% by weight.

3. The thermoplastic stretch cling film of claim 1, wherein said third layer is a polyolefin.

4. The thermoplastic stretch cling film of claim 1 wherein said structural layer comprises at least about 50 wt. % of said thermoplastic film.

* * * * *